US011588522B2

(12) United States Patent
Sun et al.

(10) Patent No.: US 11,588,522 B2
(45) Date of Patent: Feb. 21, 2023

(54) TECHNIQUES FOR SPARSE CODE MULTIPLE ACCESS (SCMA) CODEBOOK DESIGN

(71) Applicant: QUALCOMM Incorporated, San Diego, CA (US)

(72) Inventors: Haitong Sun, San Diego, CA (US); Wei Zeng, San Diego, CA (US); Joseph Binamira Soriaga, San Diego, CA (US); Peter Gaal, San Diego, CA (US); Tingfang Ji, San Diego, CA (US); John Edward Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 15/266,484

(22) Filed: Sep. 15, 2016

(65) Prior Publication Data
US 2017/0295500 A1 Oct. 12, 2017

Related U.S. Application Data

(60) Provisional application No. 62/320,298, filed on Apr. 8, 2016.

(51) Int. Cl.
*H04B 7/0456* (2017.01)
*H04L 5/00* (2006.01)
(Continued)

(52) U.S. Cl.
CPC ......... *H04B 7/0456* (2013.01); *H04L 5/0016* (2013.01); *H04L 25/03987* (2013.01);
(Continued)

(58) Field of Classification Search
None
See application file for complete search history.

(56) References Cited

U.S. PATENT DOCUMENTS 9,240,853 B2  1/2016 Nikopour et al.
2014/0140360 A1* 5/2014 Nikopour ............. H04L 27/362
370/479

(Continued)

FOREIGN PATENT DOCUMENTS

AU  2014254581 B2 * 12/2016  ........... H04B 7/0452
BR  PI0413851 A  * 10/2006  ............. H04L 27/36
(Continued)

OTHER PUBLICATIONS

Taherzadeh M., et al., "SCMA Codebook Design," 2014, 5 pages.
(Continued)

*Primary Examiner* — Christopher T Wyllie
(74) *Attorney, Agent, or Firm* — Arent Fox, LLP

(57) ABSTRACT

The present disclosure describes a method, an apparatus, and a computer readable medium for a multilayer transmission in a wireless network. For example, the method may include generating a group of binary data bits for resources of each layer of a plurality of layers, mapping the group of binary data bits of each layer of the plurality of layers to respective code words in a signal constellation, combining the code words, and transmitting the combined code word to receiver in the wireless network. As such, the multilayer transmission in a wireless network is achieved.

33 Claims, 15 Drawing Sheets

(51) Int. Cl.
*H04L 25/03* (2006.01)
*H04W 16/18* (2009.01)
*H04L 27/26* (2006.01)
*H04B 7/26* (2006.01)

(52) U.S. Cl.
CPC ........... *H04W 16/18* (2013.01); *H04B 7/2643* (2013.01); *H04L 27/2601* (2013.01); *H04L 27/2626* (2013.01)

(56) References Cited

U.S. PATENT DOCUMENTS

| | | | |
|---|---|---|---|
| 2014/0369434 A1* | 12/2014 | Taherzadehboroujeni | H04B 7/0482 375/261 |
| 2015/0288542 A1* | 10/2015 | Ashrafi | H04L 9/0858 375/261 |
| 2016/0050039 A1 | 2/2016 | Ma et al. | |
| 2016/0087694 A1 | 3/2016 | Vilaipornsawai et al. | |
| 2017/0295500 A1* | 10/2017 | Sun | H04B 7/0456 |
| 2017/0325238 A1* | 11/2017 | Yoshizawa | H04J 11/00 |
| 2017/0331662 A1* | 11/2017 | Sun | H04L 27/3411 |
| 2017/0338869 A1* | 11/2017 | Wu | H04L 25/03942 |
| 2018/0013477 A1* | 1/2018 | Kim | H04B 7/04 |
| 2018/0054334 A1* | 2/2018 | Sun | H04J 13/00 |

FOREIGN PATENT DOCUMENTS

| | | | | |
|---|---|---|---|---|
| CA | 2505051 C | * | 9/2008 | ........... H04L 1/0003 |
| CA | 2891623 A1 | * | 5/2014 | ............. H04B 1/707 |
| CN | 1684455 A | * | 10/2005 | ........... H04L 27/186 |
| CN | 101277137 A | * | 10/2008 | |
| CN | 104798317 A | | 7/2015 | |
| CN | 105392105 A | | 3/2016 | |
| CN | 105432034 A | | 3/2016 | |
| CN | 115037407 A | * | 9/2022 | ............... H04K 1/02 |
| JP | 3822982 B2 | * | 9/2006 | ........... H04L 25/061 |
| KR | 20110043438 A | * | 4/2011 | ............... H04N 7/24 |
| WO | WO-2012070686 A1 | * | 5/2012 | ......... H04B 10/5561 |

OTHER PUBLICATIONS

ZTE: "Motivation of Uplink Non-orthogonal Transmission for Massive MTC," RP-160279, 3GPP TSG RAN Meeting #71, Goteborg, Sweden, Mar. 7-10, 2016, 8 pages.
Huawei., et al., "Sparse Code Multiple Access (SCMA) for 5G Radio Transmission", 3GPP TSG RAN WG1 Meeting #84bis; R1-162155, 3rd Generation Partnership Project (3GPP), Mobile Competence Centre; 650, Route Des Lucioles ; F-06921 Sophia-Antipolis Cedex; France, vol. RAN WG1, No. Busan, Korea; 20160411-20160415, Apr. 2, 2016 (Apr. 2, 2016), XP051080001, 5 pages. Retrieved from the Internet: URL: http://www.3gpp.org/ftp/tsg_ran/WG1_RL1/TSGR1_84b/Docs/ [retrieved on Apr. 2, 2016].
International Search Report and Written Opinion—PCT/US2017/025016—ISA/EPO—Jun. 16, 2017.
Nikopour H., et al., "Sparse Code Multiple Access", 2013 IEEE 24th International Symposium on Personal, Indoor and Mobile Radio Communications: Fundamentals and PHY Track, Sep. 8, 2013 (Sep. 8, 2013), XP055227113, Retrieved from the Internet: URL: http://ieeexplore.ieee.org/ielx7/6656121/6666091/06666156.pdf?tp=&arnumber=6666156&isnumber=6666091 [retrieved on Nov. 10, 2015].
Taiwan Search Report—TW106111088—TIPO—Aug. 14, 2020.
European Search Report—EP21198552—Search Authority—The Hague—Jan. 7, 2022.

* cited by examiner

600

| | Layers | | | | | |
|---|---|---|---|---|---|---|
| | C1 615 | C2 625 | C3 635 | C4 645 | C5 655 | C6 665 |
| R1 610 | 1 | 1 | 1 | 0 | 0 | 0 |
| R2 620 | 1 | 0 | 0 | 1 | 1 | 0 |
| R3 630 | 0 | 1 | 0 | 1 | 0 | 1 |
| R4 640 | 0 | 0 | 1 | 0 | 1 | 1 |

Resources

Binary Values

|     | (0,0) | (0,1) | (1,0) | (1,1) |
|-----|-------|-------|-------|-------|
| R1  | 3     | 1     | -1    | -3    |
| R2  | -1    | 3     | -3    | 1     |

Code Words

| 1.5 bits/complex symbol, distance to Shannon Limit |||||
|---|---|---|---|---|
| QPSK + LDPC(R=0.75) | SCMA (6 layers, 4 symbols/layer, 2 bits/layer), LDPC(R=0.5) ||||
| | | Other Codebook | Design 1 (Theta_1 = 60, Theta_1 = 120) | Design 2 (Theta_1 = 45, Theta_1 = 90) |
| 1.8dB | MAP | 3.5dB | 3.2dB | >4dB |
| | MPA | 3.5dB | 3.2dB | >4dB |
| | MPA+SIC | 2.8dB | 2.5dB | 2.2dB |
| | MPA+Turbo | 1.6dB | 1.3dB | 1.5dB |

FIG. 10

Design 1

Design 2

TECHNIQUES FOR SPARSE CODE MULTIPLE ACCESS (SCMA) CODEBOOK DESIGN

CLAIM OF PRIORITY

The present application for patent claims priority to U.S. Provisional Patent Application No. 62/320,298, filed Apr. 8, 2016, entitled "Techniques for Sparse Code Multiple Access (SCMA) Codebook Design," which is assigned to the assignee hereof, and hereby expressly incorporated by reference in its entirety herein.

BACKGROUND

The present disclosure relates generally to communication systems, and more particularly, to design of code books in sparse code multiple access (SCMA) networks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In wireless communications systems employing CDMA, data symbols are spread over orthogonal or near orthogonal code sequences in which a binary code is mapped to a quadrature amplitude modulation (QAM) symbol before a spreading sequence is applied. Although this type of encoding may provide relatively higher coding rates, it may not be enough to meet the demands of current wireless networks.

As such, new techniques or mechanisms to achieve even higher coding rates are needed to meet the growing demands of the wireless networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, a method for multilayer transmission in a wireless network is provided. The method includes generating, at a transmitter, a group of binary data bits for resources of each layer of a plurality of layers; mapping, at the transmitter, the group of binary data bits of each layer of the plurality of layers to respective code words in a signal constellation, wherein the mapping is based at least on maximizing a distance between the code words within each layer of the plurality of layers; combining, at the transmitter, the code words; and transmitting, from the transmitter, the combined code word to a receiver in the wireless network.

In another example, an apparatus for multilayer transmission in a wireless network is provided. The apparatus includes means for generating, at a transmitter, a group of binary data bits for resources of each layer of a plurality of layers; means for mapping, at the transmitter, the group of binary data bits of each layer of the plurality of layers to respective code words in a signal constellation, wherein the mapping is based at least on maximizing a distance between the code words within each layer of the plurality of layers; means for combining, at the transmitter, the code words; and means for transmitting, from the transmitter, the combined code word to receiver in the wireless network.

In a further example, an apparatus for multilayer transmission in a wireless network is provided. The apparatus includes a memory; and at least one processor coupled to the memory and configured to generate, at a transmitter, a group of binary data bits for resources of each layer of a plurality of layers; map, at the transmitter, the group of binary data bits of each layer of the plurality of layers to respective code words in a signal constellation, wherein the mapping is based at least on maximizing a distance between the code words within each layer of the plurality of layers; combine, at the transmitter, the code words; and transmit, from the transmitter, the combined code word to receiver in the wireless network.

Additionally, in another example, a computer readable medium storing computer executable code for a multilayer transmission is provided. The computer readable medium includes code to generate, at a transmitter, a group of binary data bits for resources of each layer of a plurality of layers; map, at the transmitter, the group of binary data bits of each layer of the plurality of layers to respective code words in a signal constellation, wherein the mapping is based at least on maximizing a distance between the code words within each layer of the plurality of layers; combine, at the transmitter, the code words; and transmit, from the transmitter, the combined code word to receiver in the wireless network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

FIG. 7 is a diagram illustrating an aspect of a downlink subframe structure with different multi-user multiple-input multiple-output (MU-MIMO) in accordance with various aspects of the present disclosure.

FIG. 8 is a diagram illustrating an aspect of mapping binary data bits to code words in accordance with various aspects of the present disclosure.

FIGS. 9A-B illustrate examples of code book designs in a wireless communications system.

FIGS. 10, 11A-C, and 12A-B illustrate code book performance in accordance with various aspects of the present disclosure.

DETAILED DESCRIPTION

Figure 1:
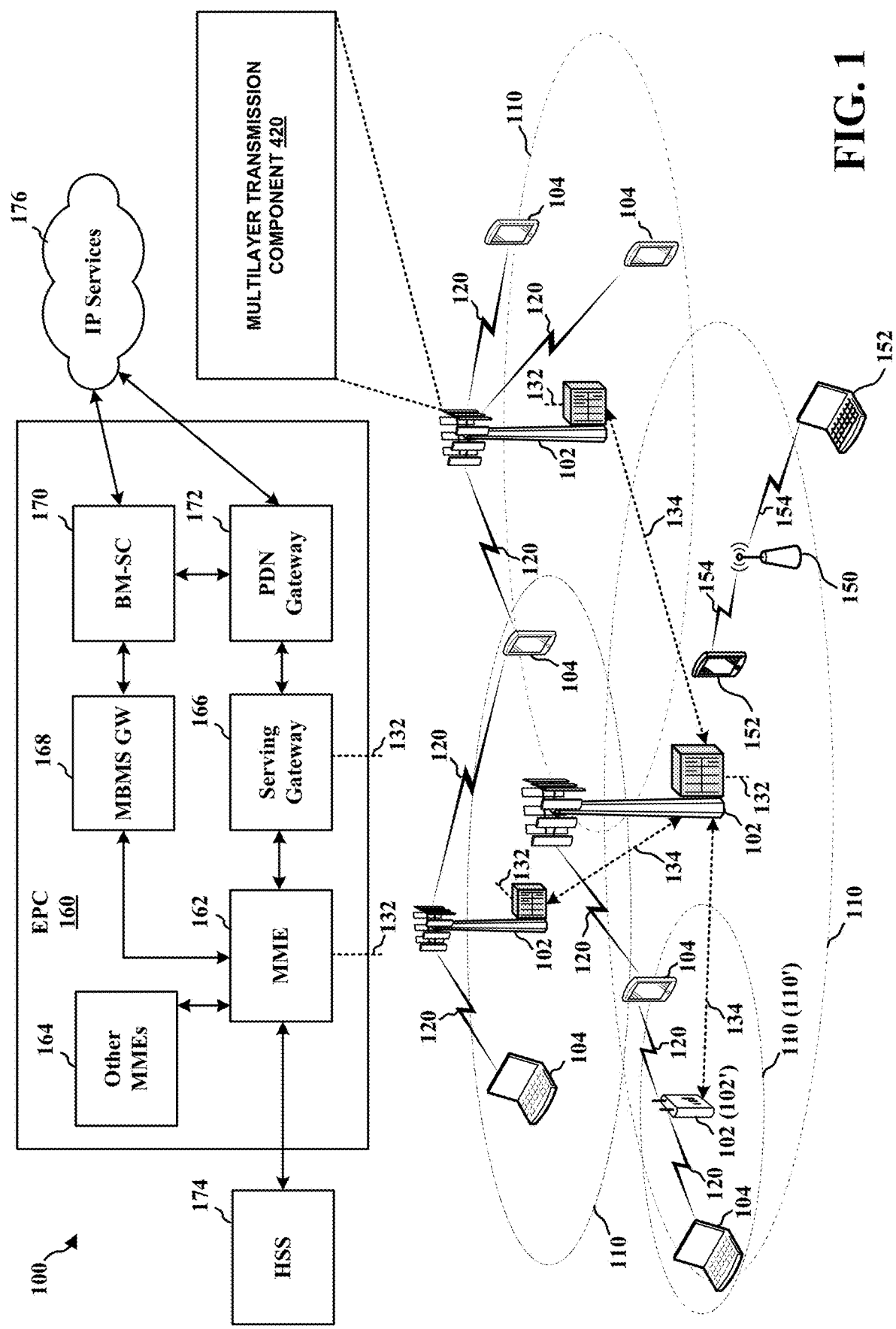
FIG. 1 is a diagram illustrating an example of a wireless communications system and an access network including a base station having an aspect of a multilayer transmission component as described herein for multilayer transmission in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present disclosure relates to a multilayer transmission at base station and/or a user equipment.

FIG. 1 is a diagram illustrating an example of a wireless communications system and an access network 100 including at least one base station 102 configured to include a multilayer transmission component 420 for multilayer transmission to at least one UE 104 in accordance with various aspects of the present disclosure. The wireless communications system 100 (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved NodeBs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 102 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an access point, a base transceiver station, a radio base station, a radio transceiver, a transceiver function, a basic service set (BSS), an extended service set (ESS), or some other suitable terminology. The eNB 106 provides an access point to the EPC 160 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 102 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
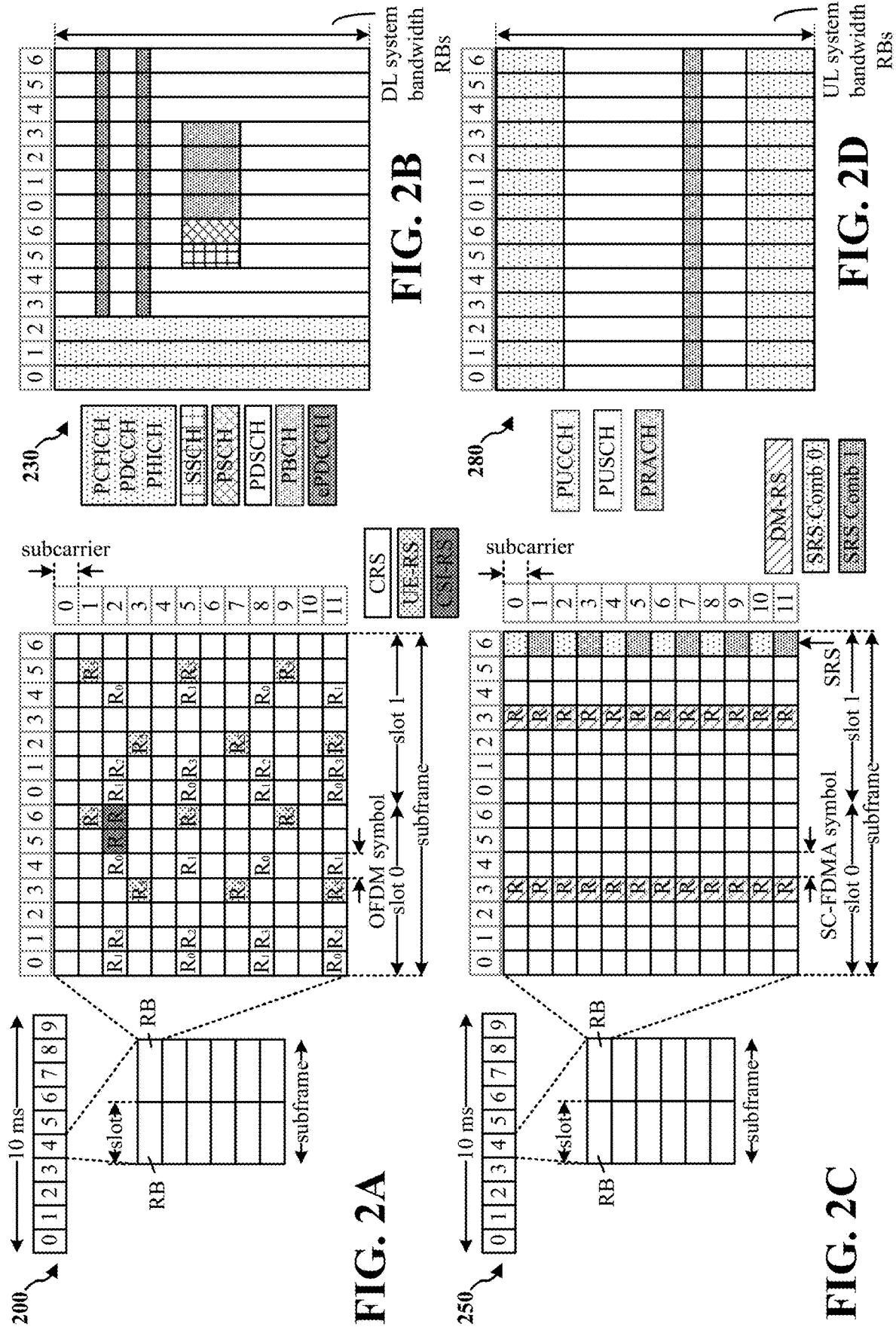
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE, which may be an example of a frame structure that may be transmitted by at least one base station 102 configured to multilayer transmission component 420 for transmitting data in accordance with various aspects of the present disclosure.

FIG. 2B is a diagram 230 illustrating an example of channels within the DL frame structure in LTE that may be transmitted by base station 102 and used by UE 104 as described herein.

FIG. 2C is a diagram 250 illustrating an example of an UL frame structure in LTE that may be used by UE 104.

FIG. 2D is a diagram 280 illustrating an example of channels within the UL frame structure in LTE that may be used by UE 104. Other wireless communication technologies may have a different frame structure and/or different channels.

In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme. Additionally, the RBs described above may also be referred to as "resources," "orthogonal resources," etc. in the present disclosure.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
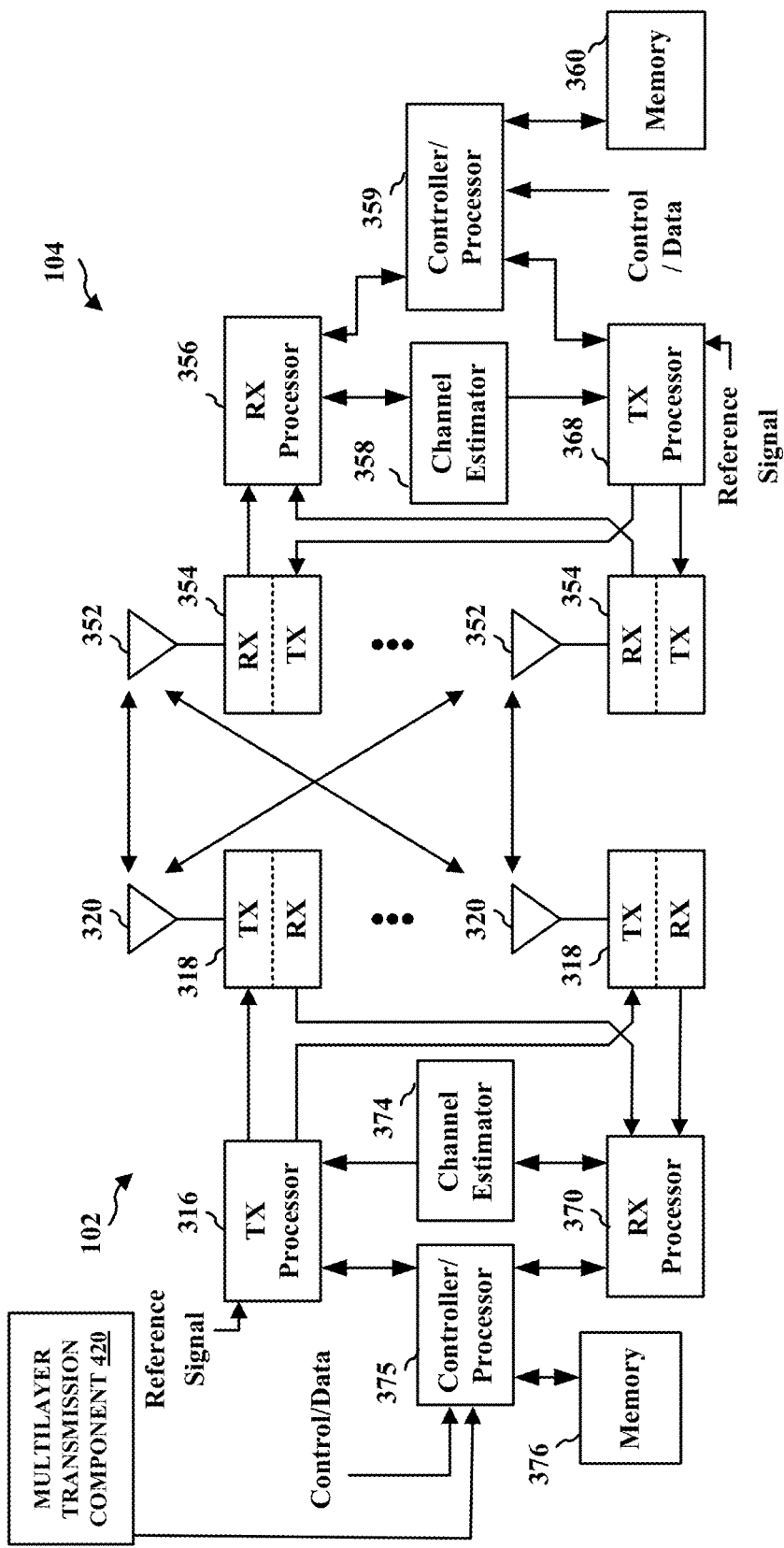
FIG. 3 is a diagram illustrating an example of an evolved Node B (eNB) and user equipment (UE) in an access network, where the UE includes an aspect of a multilayer transmission component as described herein for multilayer transmission in accordance with various aspects of the present disclosure.

FIG. 3 is a block diagram of an eNB 102 in communication with UE 104 in an access network. In an aspect, base station 102 and/or UE 104 may be configured to include multilayer transmission component 420. In an aspect, multilayer transmission component 420 may be configured to manage transmissions to multiple layers. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4:
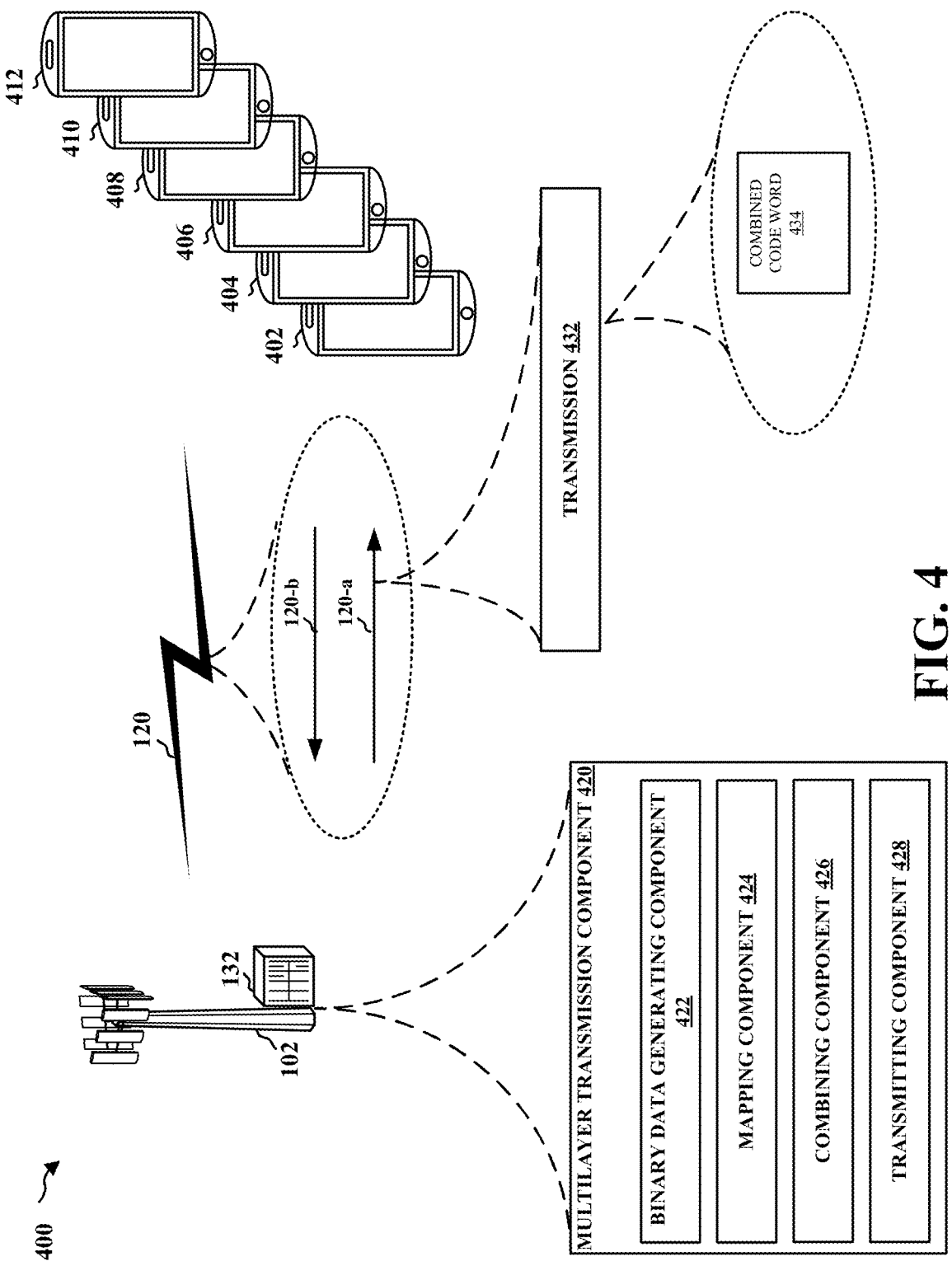
FIG. 4 is a schematic diagram of a wireless communications system including a base station having an aspect of a multilayer transmission component for multilayer transmission in accordance with various aspects of the present disclosure.

Referring to FIG. 4, in an aspect, a wireless communications system 400 (which may be the same as or similar to wireless communications system and an access network 100 of FIG. 1) includes a plurality of UEs (UEs 402, 404, 406, 408, 410, and 412, which may be the same or similar to UE 104 of FIG. 1) in communication coverage of at least one base station 102. The base station 102 (collectively referred to as Evolved Universal Mobile Telecommunications System (UMTS) Terrestrial Radio Access Network (E-UTRAN)) may interface with an EPC (such as EPC 160 of FIG. 1) through backhaul links 132 (e.g., S1 interface). In an aspect, base station 102 may include one or more processors (not shown) and, optionally, memory (not shown), that may operate in combination with multilayer transmission component 420 for transmitting data to the UEs. In an additional or optional aspect, any of the UEs (e.g., (UEs 402, 404, 406, 408, 410, and/or 412) may also include multilayer transmission component 420, one or more processors (not shown), optionally, memory (not shown), that may operate in combination with multilayer transmission component 420 for transmitting data from the UE to the base station.

In an aspect, base station 102 which may include multilayer transmission component 420 may send a transmission (e.g., SCMA transmission) 432 on downlink 120-a (only one downlink shown for simplicity) to one or more UEs (e.g., 402, 404, 406, 408, 410, and/or 412). Although six UEs (referred to as users or layers in the present disclosure) are shown in the FIG. 4, the present disclosure is not limited to six layers. In an example, four resources may be available at the base station for transmitting data to the six layers, e.g., users/UEs. At each layer, only two resources may be used for transmitting the data and no data is transmitted on the unused resources. At each layer, the data available for transmission on the downlink is converted to binary data bits. The binary data bits are then mapped to code words of a signal constellation (e.g., a code book of the respective layer) to maximize the distance between code words of a resource. The code words for all the layers are combined to generate a combined code word prior to transmission.

For example, base station 102 and/or multilayer transmission component 420 may be configured for multilayer transmission (e.g., transmission 432) by generating a group of binary data bits for resources of each of the layers, mapping each of the groups of binary data bits to a respective code word in a signal constellation, wherein the mapping of each of the groups of binary data bits is based at least on maximizing a distance between the code words within each of the layers, combining the code words, and transmitting the combined code word. Additionally, the transmission 432 may be a sparse code multiple access transmission to achieve multi-dimensional coded modulation for non-orthogonal multiple access to meet the growing demands of wireless networks.

In an additional aspect, for example, one or more of the UEs (e.g., UE 402, 404, 406, 408, 410, and/or 412) may include multilayer transmission component 420 and may send a transmission (e.g., SCMA transmission) on uplink 120-b (only one uplink shown for simplicity reasons) to the base station. As the uplinks are synchronized, the transmissions from the one or more UEs are combined at a receiving antenna of the base station. Further, the base station decodes the data transmitted on each layer using a code book associated with the respective layer to determine the data transmitted on each layer. Furthermore, a UE may be assigned more than one layer by the base station.

In a further additional aspect, multilayer transmission component 420 may include a binary data generating component 422, a mapping component 424, a combining component 426, and/or a transmitting component 428 for performing the multilayer transmission. Further, multilayer transmission component 420 and other components (422, 424, 426, and/or 428) may reside at base station 102 for multilayer transmission from the base station to the one or more UEs and/or at UE 104 for multilayer transmission from the one or more UEs to the base station.

Figure 5:
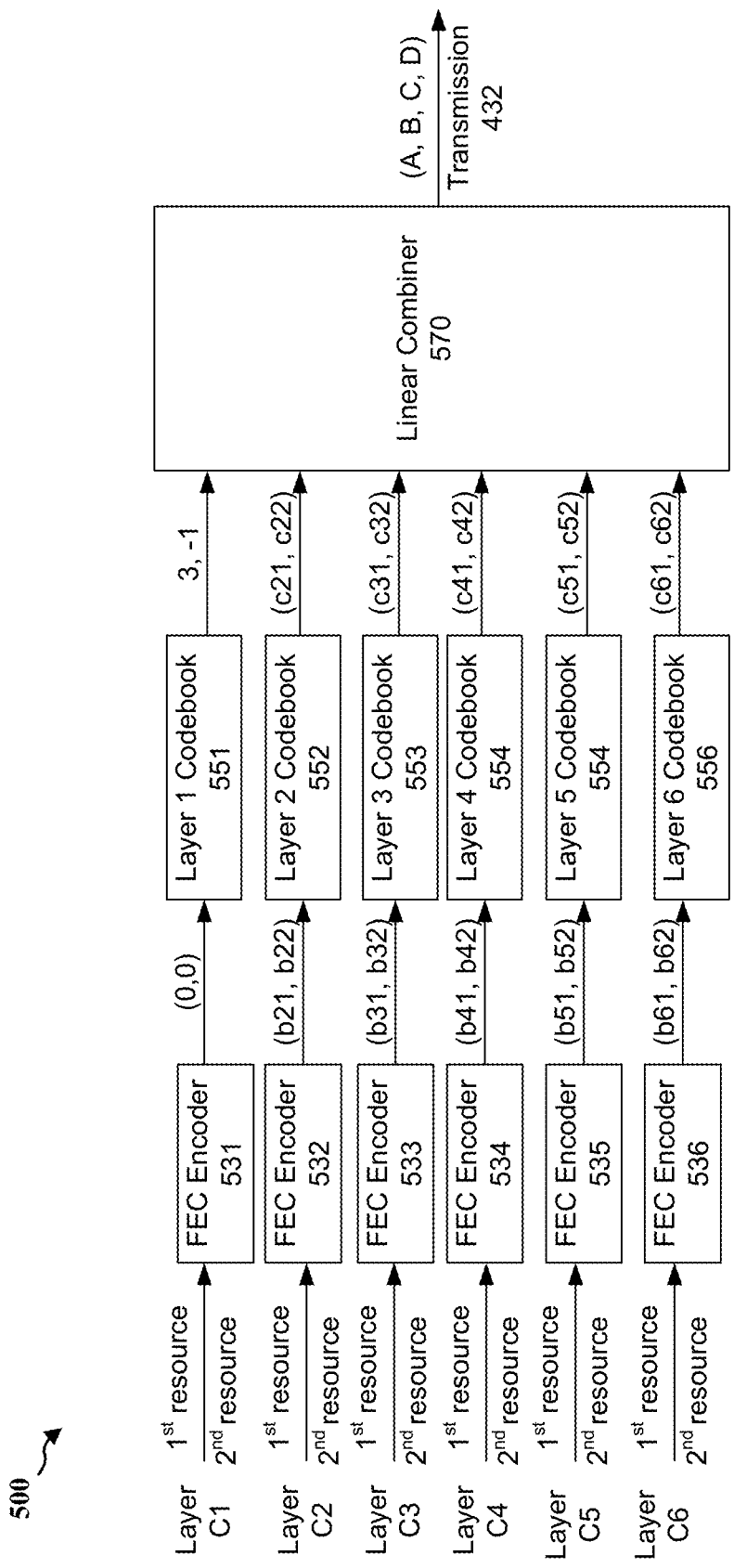
FIG. 5 is a diagram illustrating an aspect of a multilayer transmission in a wireless communications system in accordance with various aspects of the present disclosure.

FIG. 5 is a diagram illustrating a non-limiting example of a multilayer transmission 500 in a wireless communications system such as system 100 (FIG. 1) or system 400 (FIG. 4).

For example, in an aspect, a non-limiting example with six layers, four resources is described. Each layer uses two resources out of the four available resources, as described below in reference to FIG. 6. That is, each layer uses two resources (out of the four available resources) for transmission and no data is transmitted on the other two non-used resources. The resources used by a layer may be referred to as non-zero resources and the resources not used by the layer may be referred to as zero resources. Further, in an aspect, the resources may be orthogonal to each other (e.g., orthogonal resources) and may be RBs as described above in reference to FIG. 2A. Additionally, a $1^{st}$ resource and a $2^{nd}$ resource in FIG. 5 represent the used (e.g., non-zero) resources at a layer and may include any two of the four resources (e.g., any two of resources R1, R2, R3, and/or R4, as described below in reference to FIG. 6).

At each layer, an FEC encoder (e.g., FEC encoders 531, 532, 533, 534, 535, and/or 536) converts the data available for transmission at each layer to binary data bits. For instance, data available for transmission at layer C1 may be converted to binary data bits, 0 or 1, for each of the resources, e.g., for $1^{st}$ resource and the $2^{nd}$ resource. For example, in an aspect, FEC encoder 531 may output binary data bits (0,0) at layer C1 for the two resources used by layer C1. The two bits are for the two resources used at layer C1 (e.g., two non-zero resources at layer C1). In an additional or optional aspect, FEC encoder 531 may output binary data bits (0,1), (1,0), or (1, 1) at layer C1 based on the data available for transmission at the first and second resources of layer C1. A similar procedure may be used at layers C2-C6 for converting the data available for transmission at layers C2-C6 into binary data bits. For example, in an additional or optional aspect, FEC encoder 536 may output binary data bits (0,0), (0,1), (1,0), and/or (1,1) at layer C6 corresponding to the two resources used by layer C6. Although, the above example is described in the context of two bits, the disclosure is not limited to two bits for each layer. For instance, four bits may be used for each layer, e.g., (0,0,0,0), (0,0,0,1), (0,0,1,0), etc.

In an aspect, the output of an FEC encoder is mapped to code words. For instance, in an aspect, output of FEC encoder 531 (e.g., (0,0)) may be mapped to 3 and −1. The mapping of the binary data bits to code words in a signal constellation (also referred to as a "code book") is based at least on maximizing distance between the code words of different layers, specifically the code words that are close. For example, as described below in reference to FIG. 7, binary data bits (0,0) associated with layer C1 are mapped to (3, −1), binary data bits (0,1) associated with layer C1 are mapped to (1, 3), binary data bits (1,0) associated with layer C1 are mapped to (−1, −3), and binary data bits (1,1) associated with layer C1 are mapped to (−3, 1). For instance, the binary data bits (0,0) and (0,1) are separated by the maximum distance possible in the signal constellation by mapping them to (3, −1) and (1,3). This allows the receiver (e.g., receiver at UE 104 or base station 102) to correctly detect the pair of transmitted bits.

Additionally, each of the layers C2-C6 may have its own code book such that the mapping of the binary bits of a layer maximizes distance between the code words between the layers. Although, the mapping of resources (e.g., used/non-zero resources) at layer C1 is described above, similar mapping procedures may be designed or implemented for resources at layers C2-C6. For example, binary data bits of layers 2-6 associated with the first and second resources may be mapped as shown below:

(b21,b22)→(c21,c22)
(b31,b32)→(c31,c32)
(b41,b42)→(c41,c42)
(b51,b52)→(c51,c52)
(b61,b62)→(c61,c62)

Further, in an aspect, the code words for each of the layers may be combined, e.g., to a combined code word, prior to transmission. For instance, in an aspect, the code words associated with all the layers of a resource are combined via a linear combiner 570 to produce a combined code word for that resource. For example, code words for resource "R1," e.g., code words 3, c21, and c31 may be combined to produce a combined code word "A" to be transmitted on resource R1. Additionally, code words for resource "R2," e.g., code words −1, c42, and c52 may be combined to produce a combined code word "B" to be transmitted on resource R2. As a result, on the receiving side (e.g., at UE 104 or base station 102), the received signal will be a linear combination of all the layers on a particular resource. As such, when the receiver receives the multilayer transmission 432, the receiver searches for combinations of all possible signals for decoding at the receiver. As described above, data for multiple layers are transmitted from the base station. In additional aspect, the layers may be assigned to one UE, two UEs, three UEs, and so on. For instance, all the layers (i.e., six layers) may be assigned to UE 104 for increasing throughput at the UE.

Additionally, the signal constellation/code book mechanism/procedure described above is from a base station perspective, and a same/similar mechanism/procedure may be defined/implemented at a UE for transmission on an uplink at the base station.

Figure 6:
FIG. 6 is a diagram illustrating an aspect of resource allocation among various layers in a wireless communications system in accordance with various aspects of the present disclosure.

FIG. 6 is a diagram illustrating a non-limiting example of resource allocation 600 among various layers in a wireless communications system such as system 100 (FIG. 1) or system 400 (FIG. 4).

For example, in an aspect, the number of resources may be defined as "M" and the number of layers may be defined as "N," wherein the value of M is less than N. That is, the number of resources is less than the number of layers (e.g., UEs). This may result in the resources being shared by the layers (e.g., non-dedicated resources). The data may be transmitted on a downlink from base station 102 to one or more UEs 104 or on the uplink from one or more UEs 104 to base station 102. Although FIG. 6 is described in the context of four resources and six layers, the procedure/mechanism may be applied to any other numbers of resources and/or layers.

In an aspect, the resources may be represented by rows—R1 (610), R2 (620), R3 (630), and R4 (640) and the layers may be represented by columns—C1 (615), C2 (625), C3 (635), C4 (645), C5 (655), and C6 (655). Each of the resources may comprise one or more RBs which are described above in detail in reference to FIG. 2A. Additionally, as described above in reference to FIGS. 4-5, each of the layers may use two resources (out of a total of the four available resources) for transmission. That is, data is transmitted on only two resources (out of the four resources) for each layer and no data is transmitted on the other two resources. In an example aspect, the resources used by a layer may be referred to as "used" or "non-zero" resources and the resources not used by the layer may be referred to as "unused" or "zero" resources.

In an aspect, the four resources may be allocated or assigned among the six layers with each of the layers using two resources for transmission as illustrated in FIG. 6. For example, layer C1 (615) may use resources R1 (610) and R2 (620), layer C2 (625) may use resources R1 (610) and R3 (630), layer C3 (635) may use resources R1 (610) and R4 (640), layer C4 (645) may use resources R2 (620) and R3 (630), layer C5 (655) may use resources R2 (620) and R4 (640), and layer C6 (665) may use resources R3 (630) and R4 (640).

Additionally, for each of the layers, no transmission occurs on each of the other two resources not used by a layer. For example, no transmission occurs on resources R3 (630) and R4 (640) for layer C1 (615), no transmission occurs for resources R2 and R4 for layer C2, no transmission occurs for resources R2 and R3 for layer C3, no transmission occurs for resources R1 and R4 for layer C4, no transmission occurs for resources R1 and R3 for layer C5, and no transmission occurs for resources R1 and R1 for layer C6.

In an additional aspect, a pair of layers may be configured as an orthogonal pair. For example, layers C1 (615) and C6 (665) may be configured as an orthogonal pair, layers C2 (625) and C5 (655) may be configured as another orthogonal pair, and/or layers C3 (635) and C4 (645) may be configured as an additional orthogonal pair. That is, the six layers configured as three orthogonal pairs. In an aspect, a pair of layers may be configured as an orthogonal pair if they use different resources for transmission. For instance, layer C1 (615) uses resources R1 (610) and R2 (620) for transmission and layer C6 (665) uses resources R3 (630) and R4 (640) for transmission. As the resources used by layers C1 and C6 are different resources, layers C1 and C6 may be configured or defined as an orthogonal pair. Further, layer C2 uses resources R1 and R3 for transmission and layer C5 uses resources R3 and R4 for transmission. As the resources used by layers C2 and C5 are different, layers C2 and C5 are defined as an orthogonal pair. Furthermore, layer C3 uses resources R1 and R4 for transmission and layer C4 uses resources R2 and R3 for transmission. As the resources used by layers C3 and C4 are different resources (in other words, different orthogonal resources), layers C1 and C6 are defined as an orthogonal pair In an additional aspect, layers may be rotated to increase distance between code words of each of the layers. For example, in an aspect, layer C2 (625) may be rotated by 60° from layer C1 (615) to increase the distance between the code words, for example, in two dimension, from layer C1. Further, layer C3 (635) may be rotated by 120° from layer C1 to increase the distance, for example, in two dimension, from layer C1. That is, layer C3 is rotated an additional 60° from layer C2 to increase the distance from C2. This may increase the success rate of decoding at the receiver when the receiver is decoding the data received at the receiver as the code words are separated. In an additional or optional aspect, layer C2 (625) may be rotated by 45° from layer C1 (615) to increase the distance between the code words, for example, in two dimension, from layer C1. Further, layer C3 (635) may be rotated by 90° from layer C1 to increase the distance, for example, in two dimension, from layer C1. That is, layer C3 is rotated an additional 45° from layer C2 to increase the distance from C2. As the layers are rotated differently, the performance at the receiving end may differ as well. For instance, the performance achieved with rotating the layers 60°/120° is better than the performance achieved by rotating the layers 45°/90° as illustrated in FIGS. 9A, 9B, 10, 11B, and 11C.

Figure 7:
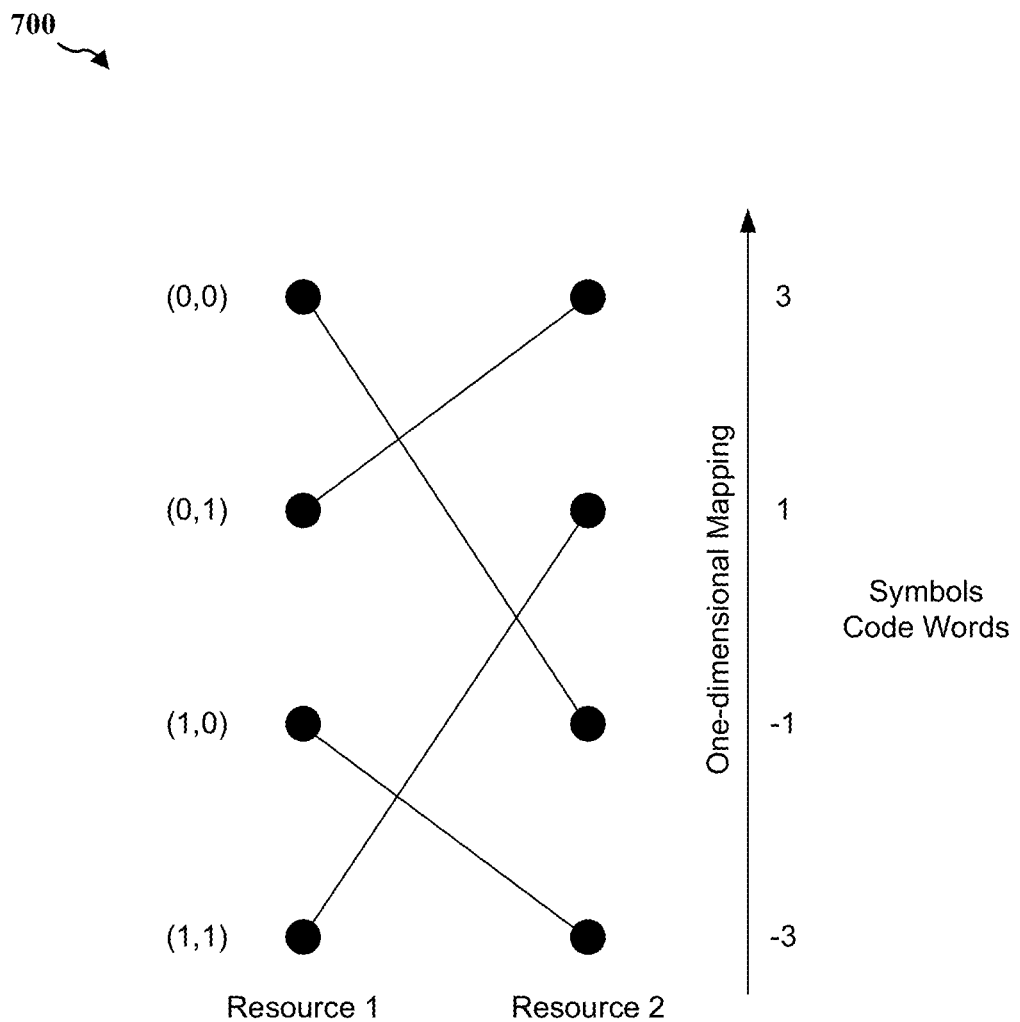
FIG. 7 is a diagram illustrating a non-limiting example of mapping of binary data bits 700 of a group of layers to code words in a wireless communications system such as system 100 (FIG. 1) or system 400 (FIG. 4).

FIG. 7 is a diagram illustrating a non-limiting example of mapping binary data bits of a group of layers to code words in a wireless communications system such as system 100 (FIG. 1) or system 400 (FIG. 4).

For example, in an aspect, binary data bits associated with each of the resources of the layers are mapped to code words in a signal constellation (e.g., a codebook), wherein each of the layers may have its own codebook. For instance, in reference to layer C1, binary data bits "0" and "0" (represented by (0,0) in FIG. 7) associated with resources R1 and R2 may be mapped to "3" and "−1," respectively. Additionally, in reference to layer C1, binary data bits (0,1) associated with resources R1 and R2 may be mapped to "1" and "3," respectively; binary data bits (1,0) associated with resources R1 and R2 may be mapped to "−1" and "−3," respectively; and binary data bits (1,1) associated with resources R1 and R2 may be mapped to "−3" and "1," respectively. For instance, in an aspect, the mapping of resources, e.g., R1 and R2 of layer C1, to code words 3 and −1, is performed in such as way the distance between the code words (of the signal constellation or code book) is maximized to increase the likelihood of successful decoding at the receiver. Although, the mapping of the binary data bits to code words in a signal constellation is described above in the context of one layer, e.g., layer C1, similar mapping procedure may be implemented for each of the other layers.

FIG. 8 is a diagram illustrating a non-limiting example of mapping of a group of binary data bits to code words in a wireless communications system such as system 100 (FIG. 1) or system 400 (FIG. 4). For example, the mapping of a group of binary data bits associated with layer C1 to code words in a signal constellation (e.g., a codebook) of layer C1 are shown in FIG. 8.

Figures 9A, 9B:
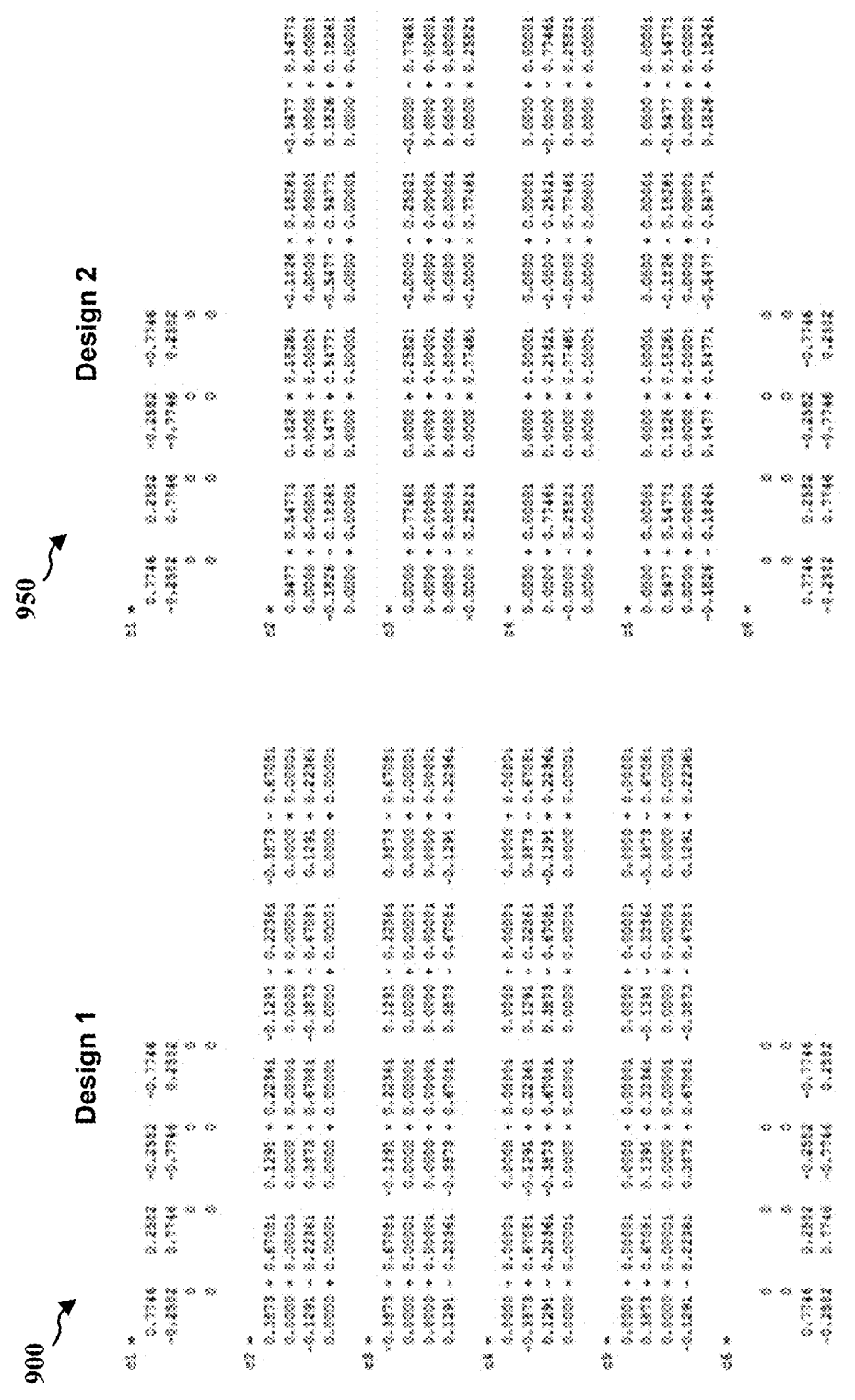

FIGS. 9A-B illustrate non-limiting examples of code book designs 900 and 950 in a wireless communications system such as system 100 (FIG. 1) or system 400 (FIG. 4). For example, FIG. 9A illustrates a code book design for layer C1 with the signal constellation rotated by 60° for layer C2 and 120° for layer C3 (referred to as "Design 1"). Additionally, FIG. 9B illustrates an additional code book design for layer C1 with the signal constellation rotated by 45° for layer C2 and 90° for layer C3 (referred to as "Design 2").

FIG. 10 is a diagram illustrating code book performance with six layers, 4 resources (or symbols) per layers, and 2 bits used per each layer. As illustrated in FIG. 10, the performance of Design 1 (i.e., rotated by 60°/120°) is relatively better than the performance of Design 2 (i.e., rotated by 45°/90°), both of which are relatively better than know code book designs.

Figure 11A:
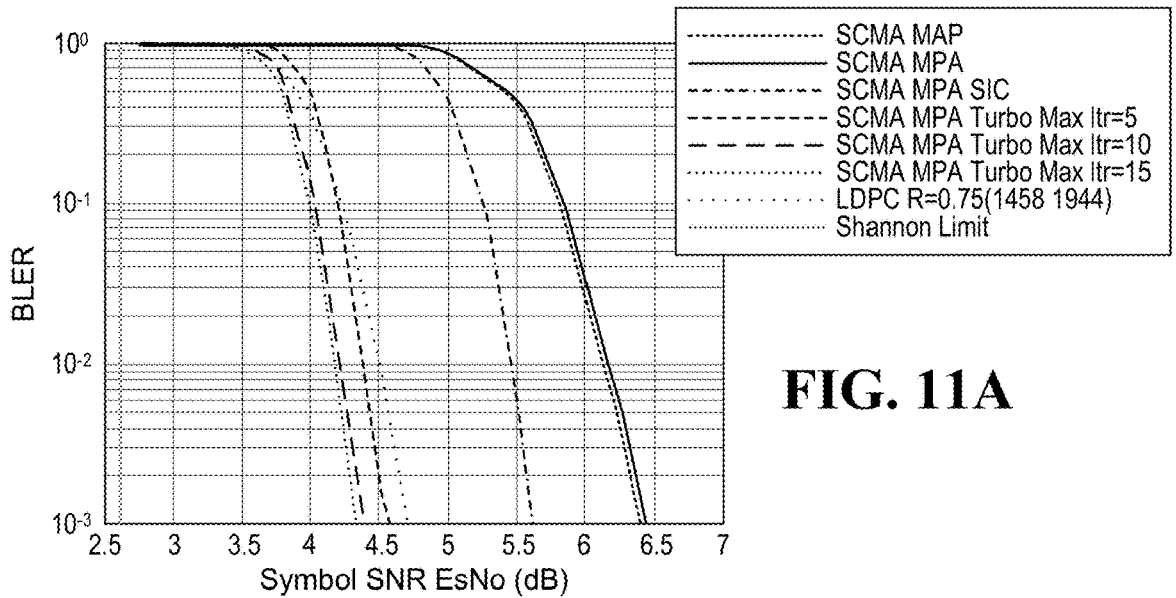
Figure 11B:
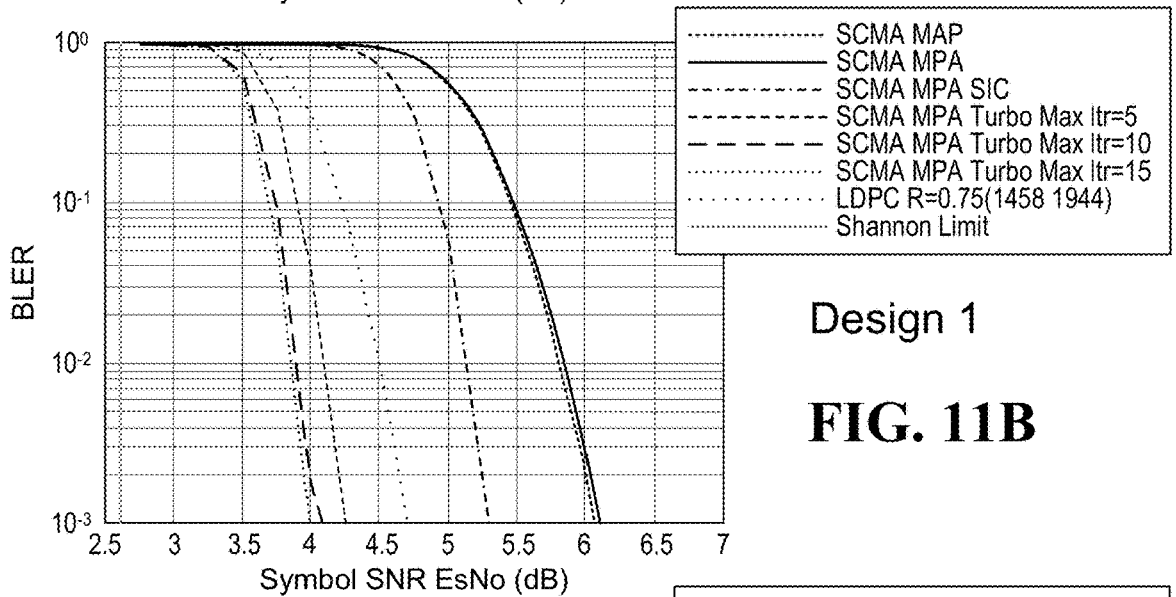
Figure 11C:
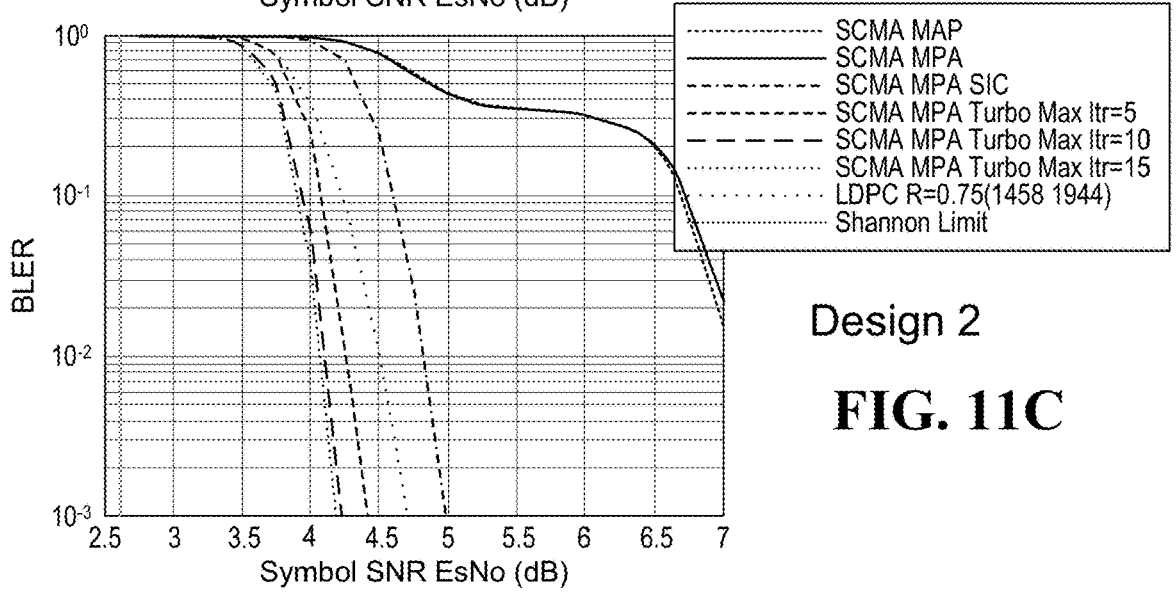

FIGS. 11A-C illustrate code book performance with known code book designs (FIG. 11A) and Design 1 (i.e., rotated by 60°/120°) and Design 2 (i.e., rotated by 45°/90°).

Figure 12A:
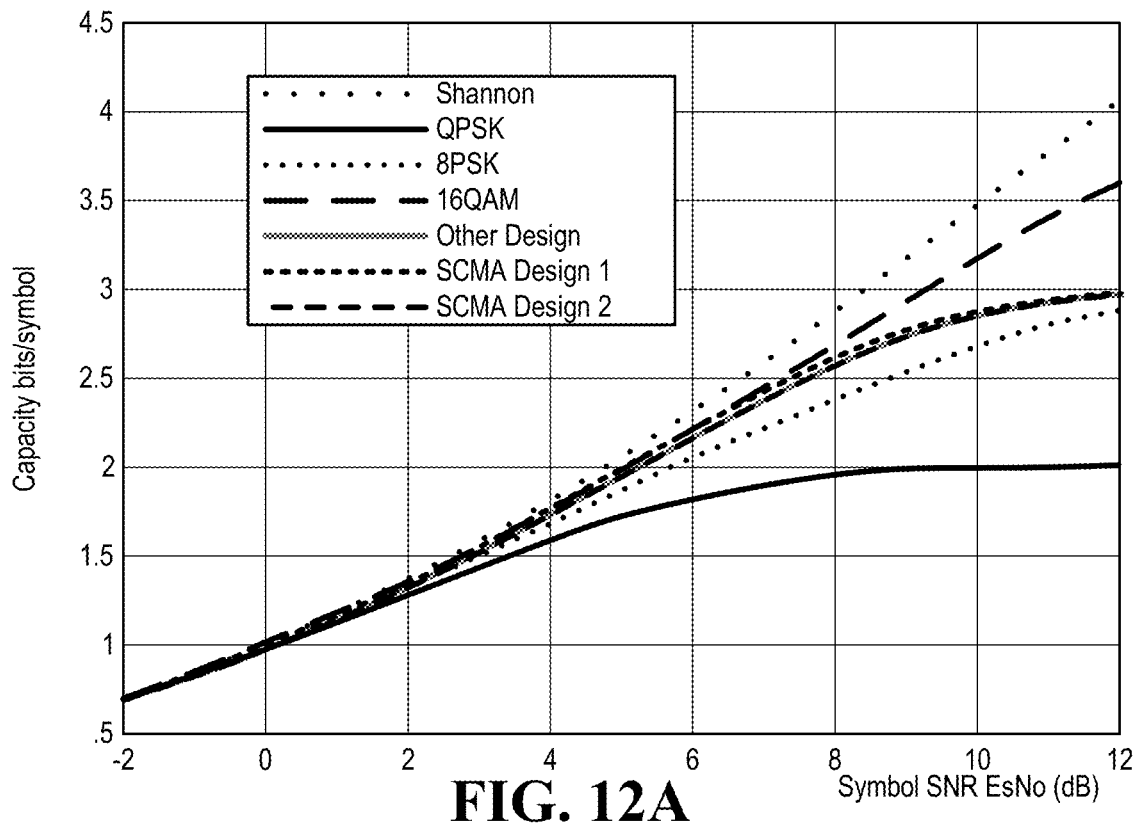
Figure 12B:
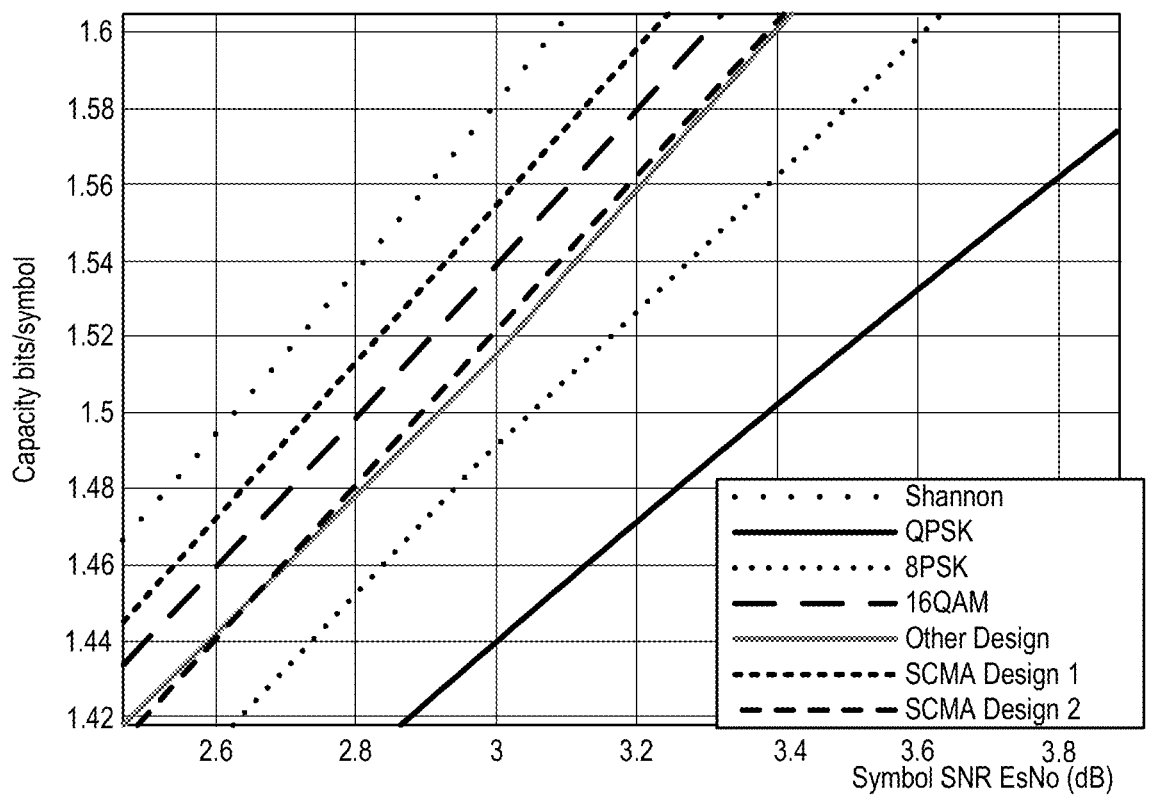

FIGS. 12A-B illustrate code book performance with a known code book design, and Design 1 (i.e., rotated by 60°/120°) and Design 2 (i.e., rotated by 45°/90°) in accordance with aspects of the present disclosure.

Figure 13:
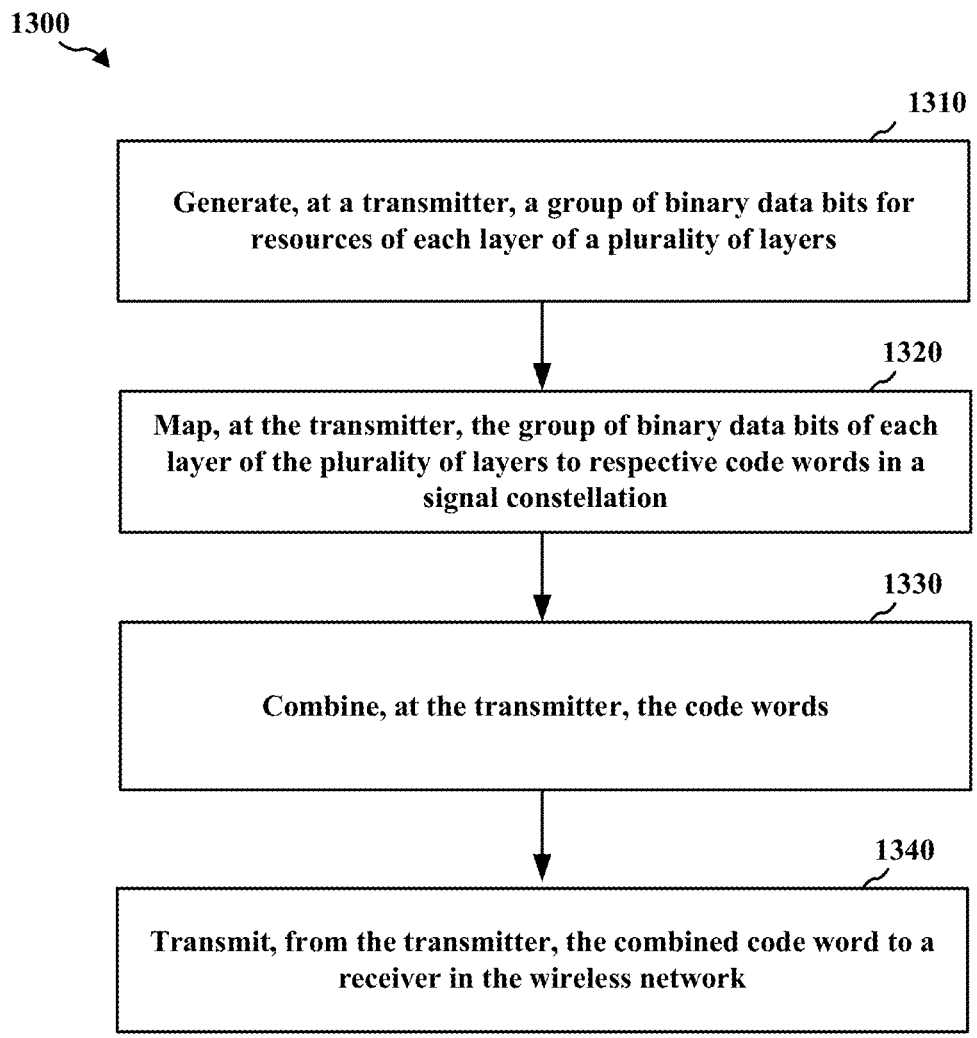
FIG. 13 is a flow diagram of an aspect of a multilayer transmission, which may be executed by the multilayer transmission component of FIG. 4.

FIG. 13 is a flow diagram of an aspect of a multilayer transmission, which may be executed by the multilayer transmission component 420 of FIG. 4. Referring to FIG. 13, a base station such as base station 102 and/or UE 104 (FIGS. 1 and 4) may include one or more processors to perform an aspect of a method 1300 for a multilayer transmission. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 1310, the method 1300 may include generating, at a transmitter, a group of binary data bits for resources of each layer of a plurality of layers. For example, in an aspect, base station 102 and/or multilayer transmission component 420 may generate a group of binary data bits (for example, (0,0) for layer C1, etc.) for resources of all six layers. In an aspect, binary data generating component 422 may generate the group of binary data bits for resources of each layer of the plurality of layers. In an additional or optional aspect, generating a group of binary data bits may be performed by/at a FEC encoder (e.g., FEC encoder 531 for layer C1). In an additional or optional aspect, UE 104 and/or multilayer transmission component 420 may generate a group of binary data bits (for example, (0,0) for layer C1, etc.) for resources of all six layers.

In an aspect, at block 1320, the method 1300 may include the group of binary data bits of each layer of the plurality of layers to respective code words in a signal constellation, wherein the mapping is based at least on maximizing a distance between the code words within each layer of the plurality of layers. For example, in an aspect, base station 102 and/or multilayer transmission component 420 may map each of the groups of binary data bits (for example, (0,0)) to respective code words (for example, (3, −1)) in a signal constellation, wherein the mapping is based at least on maximizing a distance between the code words within each layer of the plurality of layers (e.g., distance is maximized between 3 and −1). In an aspect, mapping component 424 may perform the mapping. In an additional or optional aspect, mapping may be performed by at/by a code book (e.g., code book 551 for layer C1). In an additional or optional aspect, UE 104 and/or multilayer transmission component 420 may map the group of binary data bits of each layer of the plurality of layers to respective code words in a signal constellation, wherein the mapping is based at least on maximizing a distance between the code words within each layer of the plurality of layers.

In an aspect, at block 1330, the method 1300 may include combining, at the transmitter, the code words. For example, in an aspect, base station 102 and/or multilayer transmission component 420 may combine the code words at the transmitter, e.g., prior to transmission. In an aspect, combining component 426 may perform the combining. In an additional or optional aspect, the combining may be performed at/by a linear combiner 570. In an additional or optional aspect, UE 104 and/or multilayer transmission component 420 may combine, at the transmitter, the code words.

In an aspect, at block 1340, the method 1300 may include transmitting, from the transmitter, the combined code word to a receiver in the wireless network. For example, in an aspect, base station 102 and/or multilayer transmission component 420 may transmit the combined 432. In an aspect, transmitting component 428 may perform the transmission. In an additional or optional aspect, UE 104 and/or multilayer transmission component 420 may transmit the combined code word to a receiver in the wireless network.

In an example aspect, base station 102 may be the transmitter and UE 104 may be the receiver, for example, in a downlink SCMA transmission from base station 102 to UE 104. In an additional example aspect, UE 104 may be the transmitter and base station 102 may be the receiver, for example, in an uplink SCMA transmission from UE 104 to base station 102.

Figure 14:
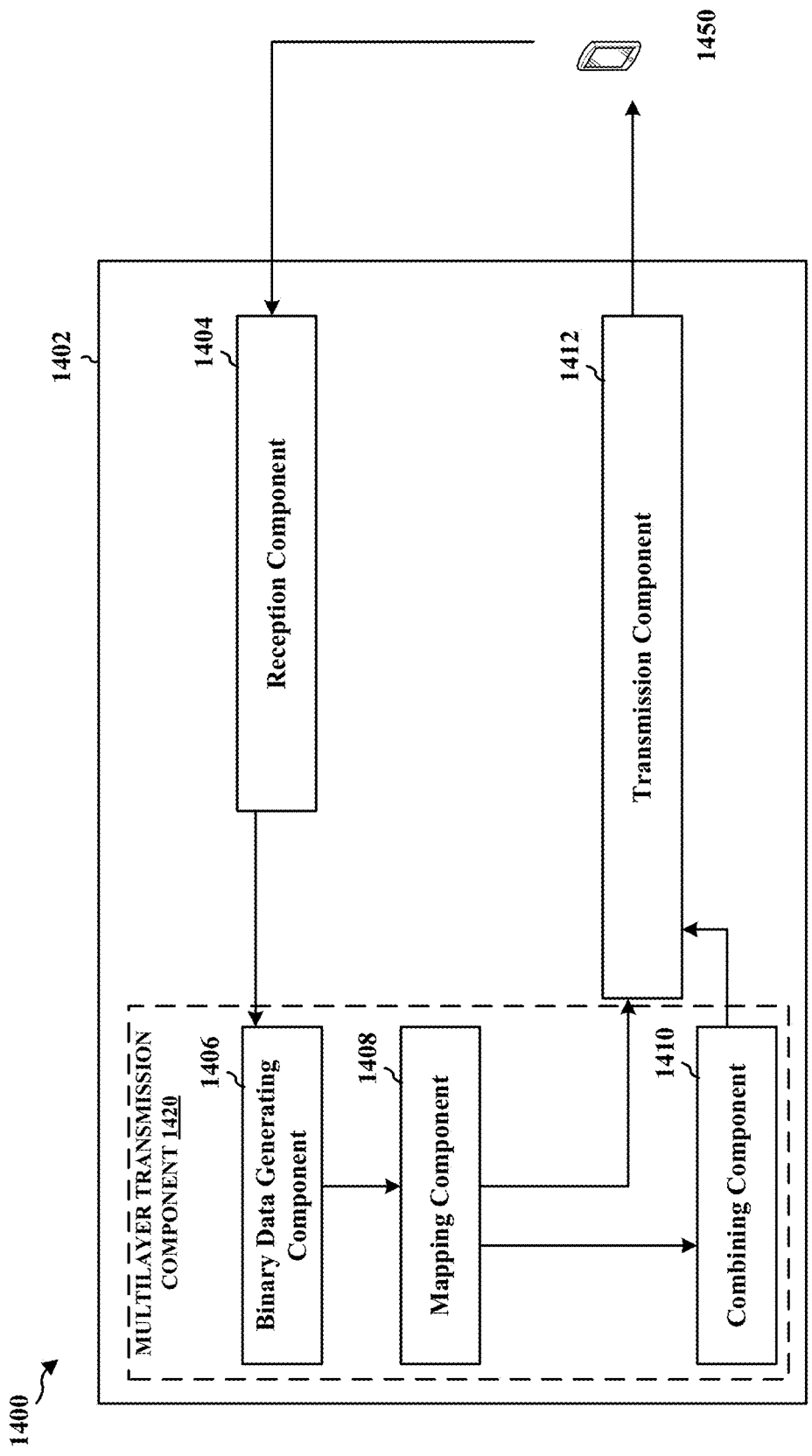
FIG. 14 is a conceptual data flow diagram illustrating the data flow between different means/components in an exemplary apparatus including a multilayer transmission component for a multilayer transmission in accordance with various aspects of the present disclosure.

FIG. 14 is a conceptual data flow diagram 1400 illustrating the data flow between different means/components in an exemplary apparatus 1402 that includes multilayer transmission component 1420, which may be the same as or similar to multilayer transmission component 420 of FIG. 4 for multilayer transmission. The apparatus may be a base station, which may be base station 102 of FIG. 1 or 4, and/or a UE which may be UE 104 of FIG. 1 or 4. The apparatus includes a binary data generating component 1406 to generate a group of binary data bits for resources of each of the layers, a mapping component 1408 to map each of the groups of binary data bits to a respective code word in a signal constellation, a combining component 1410 to combine the code words, and a transmission component 1412 to transmit the combined code word, and a reception component 1404 that receives one or more signals (e.g., combined code words) from UE 1450.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
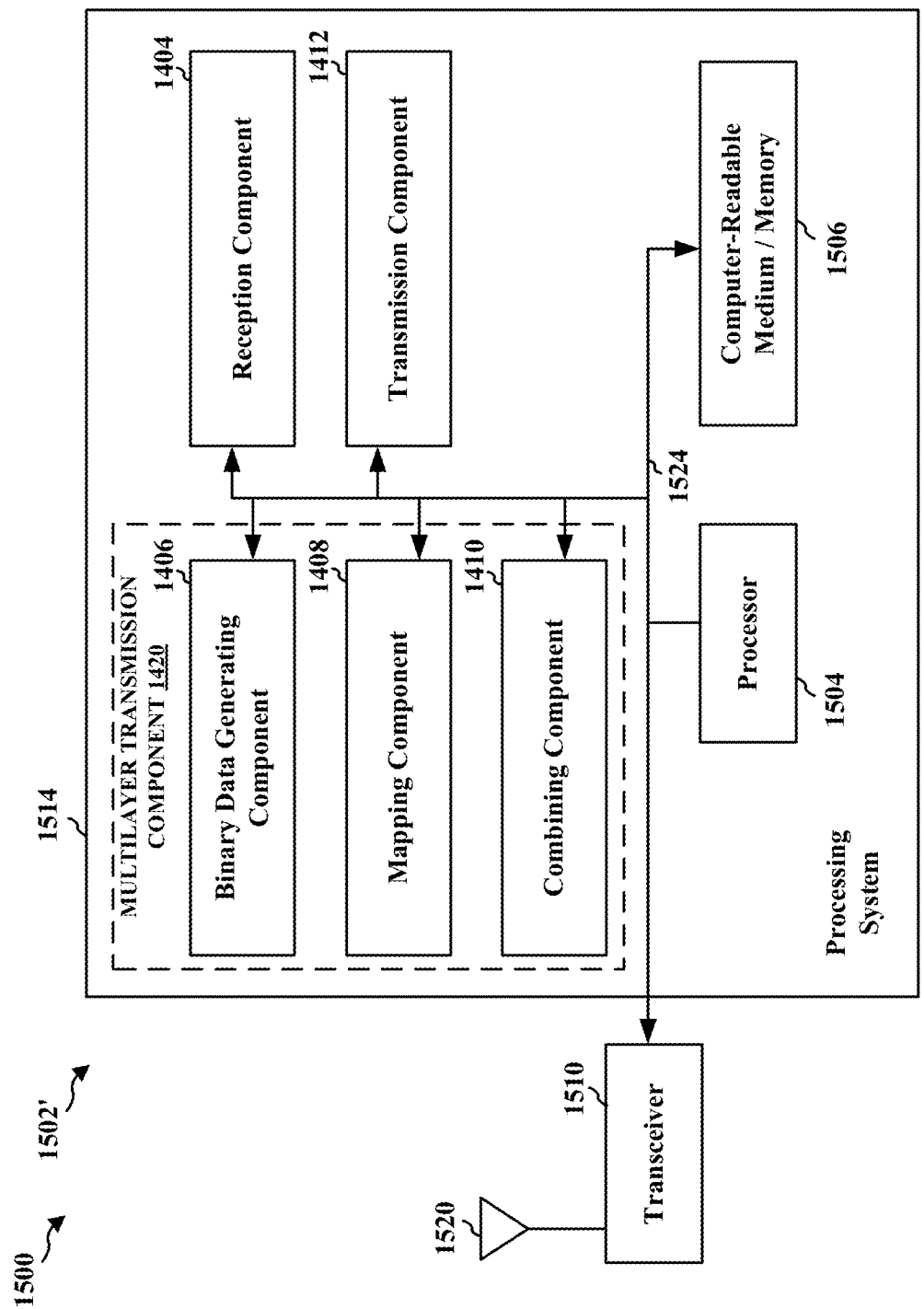
FIG. 15 is a diagram illustrating an example of a hardware implementation for an apparatus employing a processing system including a multilayer component for a multilayer transmission in accordance with various aspects of the present disclosure.

FIG. 15 is a diagram 1500 illustrating an example of a hardware implementation for an apparatus 1502' employing a processing system 1514 that includes multilayer transmission component 1420 (of FIG. 14), which may be the same as or similar to multilayer transmission component 420 (of FIG. 4) for multilayer transmission. The processing system 1514 may be implemented with a bus architecture, represented generally by bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, components 1404, 1406, 1408, 1410, and 1412, and computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1412, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, and 1412. The components may be software components running in the processor 1504, resident/stored in the computer readable medium/memory 1506, one or more hardware components coupled to the processor 1504, or some combination thereof.

In one configuration, the apparatus 1502/1502' for wireless communication includes means for generating a group of binary data bits for resources of each of the layers; means for mapping each of the groups of binary data bits to a respective code word in a signal constellation, wherein the mapping of each of the groups of binary data bits is based at least on maximizing a distance between the code words within each of the layers; means for combining the code words; and means for transmitting the combined code word. The aforementioned means may be one or more of the aforementioned components of the apparatus 1502 and/or the processing system 1514 of the apparatus 1502' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. In an additional aspect, the processing system 1514 may include the TX Processor 368, the RX Processor 356, and the controller/processor 359. As such, in another configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of a multilayer transmission in a wireless network, comprising:
   generating data for transmission for each layer of a plurality of layers;
   converting the data for each layer into a respective group of data bits for the respective layer, each data bit of the group of data bits being for a respective non-zero resource of a plurality of resources for the respective layer, the plurality of layers being configured as a plurality of orthogonal layer pairs;

mapping the group of data bits for each layer to respective code words associated with a signal constellation, the mapping including mapping the group of data bits of at least one respective layer based on increasing a distance from another group of data bits within the at least one respective layer;

rotating the signal constellation across a first orthogonal layer pair of the plurality of orthogonal pairs by one of 45 degrees or 60 degrees for a second orthogonal layer pair of the plurality of orthogonal pairs and by one of 90 degrees or 120 degrees for a third orthogonal pair of the plurality of orthogonal pairs;

linearly combining the code words for the plurality of layers for each resource of the plurality of resources into a combined code word for the respective resource; and transmitting the combined code words for the plurality of resources.

2. The method of claim 1, wherein the multi-layer transmission is a sparse code multiple access (SCMA) transmission.

3. The method of claim 1, wherein the plurality of resources comprises orthogonal resources, and the method further comprising:

creating the orthogonal resources using tones in orthogonal frequency division multiple access (OFDMA), orthogonal codes in code division multiple access, times in time division multiplexing (TDM), or different spatial signatures.

4. The method of claim 1, wherein the multi-layer transmission comprises a first number of resources and a second number of layers, and wherein the first number of resources is smaller than the second number of layers.

5. The method of claim 4, wherein the first number of resources is four, the second number of layers is six, and a number of resources used by each of the layers is two.

6. The method of claim 5, wherein the six layers are configured as three orthogonal pairs.

7. The method of claim 1, wherein rotating the signal constellation across the first orthogonal layer pair of the plurality of orthogonal layer pairs increases the distance between at least one code word of at least one layer of one of the plurality of orthogonal layer pairs and at least one other code word of at least one other layer of another of the plurality of orthogonal layer pairs in two dimension.

8. The method of claim 7, wherein at least one of the plurality of orthogonal layer pairs is obtained by rotating the signal constellation by a number of degrees.

9. The method of claim 1, wherein the increasing the distance between the code word for the at least one respective layer of the plurality of layers and the code word for the at least one other respective layer of the plurality of layers in the signal constellation comprises:

maximizing the distance between the code word for the at least one respective layer of the plurality of layers and the code word for the at least one other respective layer of the plurality of layers in the signal constellation.

10. An apparatus for a multilayer transmission in a wireless network, comprising:

means for generating data for transmission for each layer of a plurality of layers;

means for converting the data for each layer into a respective group of data bits for the respective layer, each data bit of the group of data bits being for a respective non-zero resource of a plurality of resources for the respective layer, the plurality of layers being configured as a plurality of orthogonal layer pairs;

means for mapping the group of data bits for each layer to respective code words associated with a signal constellation, the mapping including mapping the group of data bits of at least one respective layer based on increasing a distance from another group of data bits within the at least one respective layer;

means for rotating the signal constellation across a first orthogonal layer pair of the plurality of orthogonal pairs by one of 45 degrees or 60 degrees for a second orthogonal layer pair of the plurality of orthogonal pairs and by one of 90 degrees or 120 degrees for a third orthogonal pair of the plurality of orthogonal pairs;

means for linearly combining the code words for the plurality of layers for each resource of the plurality of resources into a combined code word for the respective resource; and means for transmitting the combined code words for the plurality of resources.

11. The apparatus of claim 10, wherein the multi-layer transmission is a sparse code multiple access (SCMA) transmission.

12. The apparatus of claim 10, wherein the plurality of resources comprises orthogonal resources, and further comprising:

means for creating the orthogonal resources using tones in orthogonal frequency division multiple access (OFDMA), orthogonal codes in code division multiple access, times in time division multiplexing (TDM), or different spatial signatures.

13. The apparatus of claim 10, wherein the multi-layer transmission comprises a first number of resources and a second number of layers, and wherein the first number of resources is smaller than the second number of layers.

14. The apparatus of claim 13, wherein the first number of resources is four, the second number of layers is six, and a number of resources used by each of the layers is two.

15. The apparatus of claim 14, wherein the six layers are configured as three orthogonal pairs.

16. The apparatus of claim 10, wherein the means for rotating the signal constellation across the first orthogonal layer pair of the plurality of orthogonal layer pairs is configured to increase the distance between at least one code word of at least one layer of one of the plurality of orthogonal layer pairs and at least one other code word of at least one other layer of another of the plurality of orthogonal layer pairs in two dimension.

17. The apparatus of claim 16, wherein at least one of the plurality of orthogonal layer pairs is obtained by rotating the signal constellation by a number of degrees.

18. An apparatus for a multilayer transmission in a wireless network, comprising:

a memory; and at least one processor coupled to the memory and configured to:

generate data for transmission for each layer of a plurality of layers;

convert the data for each layer into a respective group of data bits for the respective layer, each data bit of the group of data bits being for a respective non-zero resource of a plurality of resources for the respective layer, the plurality of layers being configured as a plurality of orthogonal layer pairs;

map the group of data bits for each layer to respective code words associated with a signal constellation, the mapping including mapping the group of data bits of at least one respective layer based on increasing a distance from another group of data bits within the at least one respective layer;

rotate the signal constellation across a first orthogonal layer pair of the plurality of orthogonal pairs by one of 45 degrees or 60 degrees for a second orthogonal layer pair of the plurality of orthogonal pairs and by one of 90 degrees or 120 degrees for a third orthogonal pair of the plurality of orthogonal pairs;

linearly combine the code words for the plurality of layers for each resource of the plurality of resources into a combined code word for the respective resource; and transmit the combined code words for the plurality of resources.

19. The apparatus of claim 18, wherein the multi-layer transmission is a sparse code multiple access (SCMA) transmission.

20. The apparatus of claim 18, wherein the plurality of resources comprises orthogonal resources, and wherein at least one processor is further configured to:

create the orthogonal resources using tones in orthogonal frequency division multiple access (OFDMA), orthogonal codes in code division multiple access, times in time division multiplexing (TDM), or different spatial signatures.

21. The apparatus of claim 18, wherein the multi-layer transmission comprises a first number of resources and a second number of layers, and wherein the first number of resources is smaller than the second number of layers.

22. The apparatus of claim 21, wherein the first number of resources is four, the second number of layers is six, and a number of resources used by each of the layers is two.

23. The apparatus of claim 22, wherein the six layers are configured as three orthogonal pairs.

24. The apparatus of claim 18, wherein the rotation of the signal constellation across the first orthogonal layer pair of the plurality of orthogonal layer pairs increases the distance between at least one code word of at least one layer of one of the plurality of orthogonal layer pairs and at least one other code word of at least one other layer of another of the plurality of orthogonal layer pairs in two dimension.

25. The apparatus of claim 24, wherein at least one of the plurality of orthogonal layer pairs is obtained by rotating the signal constellation by a number of degrees.

26. A non-transitory computer-readable medium storing computer executable code for a multilayer transmission in a wireless network, comprising code to:

generate data for transmission for each layer of a plurality of layers;

convert the data for each layer into a respective group of data bits for the respective layer, each data bit of the group of data bits being for a respective non-zero resource of a plurality of resources for the respective layer, the plurality of layers being configured as a plurality of orthogonal layer pairs;

map the group of data bits for each layer to respective code words associated with a signal constellation, the mapping including mapping the group of data bits of at least one respective layer based on increasing a distance from another group of data bits within the at least one respective layer;

rotate the signal constellation across a first orthogonal layer pair of the plurality of orthogonal pairs by one of 45 degrees or 60 degrees for a second orthogonal layer pair of the plurality of orthogonal pairs and by one of 90 degrees or 120 degrees for a third orthogonal pair of the plurality of orthogonal pairs;

linearly combine the code words for the plurality of layers for each resource of the plurality of resources into a combined code word for the respective resource; and transmit the combined code words for the plurality of resources.

27. The non-transitory computer-readable medium of claim 26, wherein the multi-layer transmission is a sparse code multiple access (SCMA) transmission.

28. The non-transitory computer-readable medium of claim 26, wherein the plurality of resources comprises orthogonal resources, and further comprising code to:

create the orthogonal resources using tones in orthogonal frequency division multiple access (OFDMA), orthogonal codes in code division multiple access, times in time division multiplexing (TDM), or different spatial signatures.

29. The non-transitory computer-readable medium of claim 26, wherein the multi-layer transmission comprises a first number of resources and a second number of layers, and wherein the first number of resources is smaller than the second number of layers.

30. The non-transitory computer-readable medium of claim 29, wherein the first number of resources is four, the second number of layers is six, and a number of resources used by each of the layers is two.

31. The non-transitory computer-readable medium of claim 30, wherein the six layers are configured as three orthogonal pairs.

32. The non-transitory computer-readable medium of claim 26, wherein the rotation of the signal constellation across the first orthogonal layer pair of the plurality of orthogonal layer pairs increases the distance between at least one code word of at least one layer of one of the plurality of orthogonal layer pairs and at least one other code word of at least one other layer of another of the plurality of orthogonal layer pairs in two dimension.

33. The non-transitory computer-readable medium of claim 32, wherein at least one of the plurality of orthogonal layer pairs is obtained by rotating the signal constellation by a number of degrees.

* * * * *